Feb. 13, 1951        G. J. GRASSLE        2,541,239
ELECTRIC CORD AND PLUG SET
Filed Sept. 27, 1946
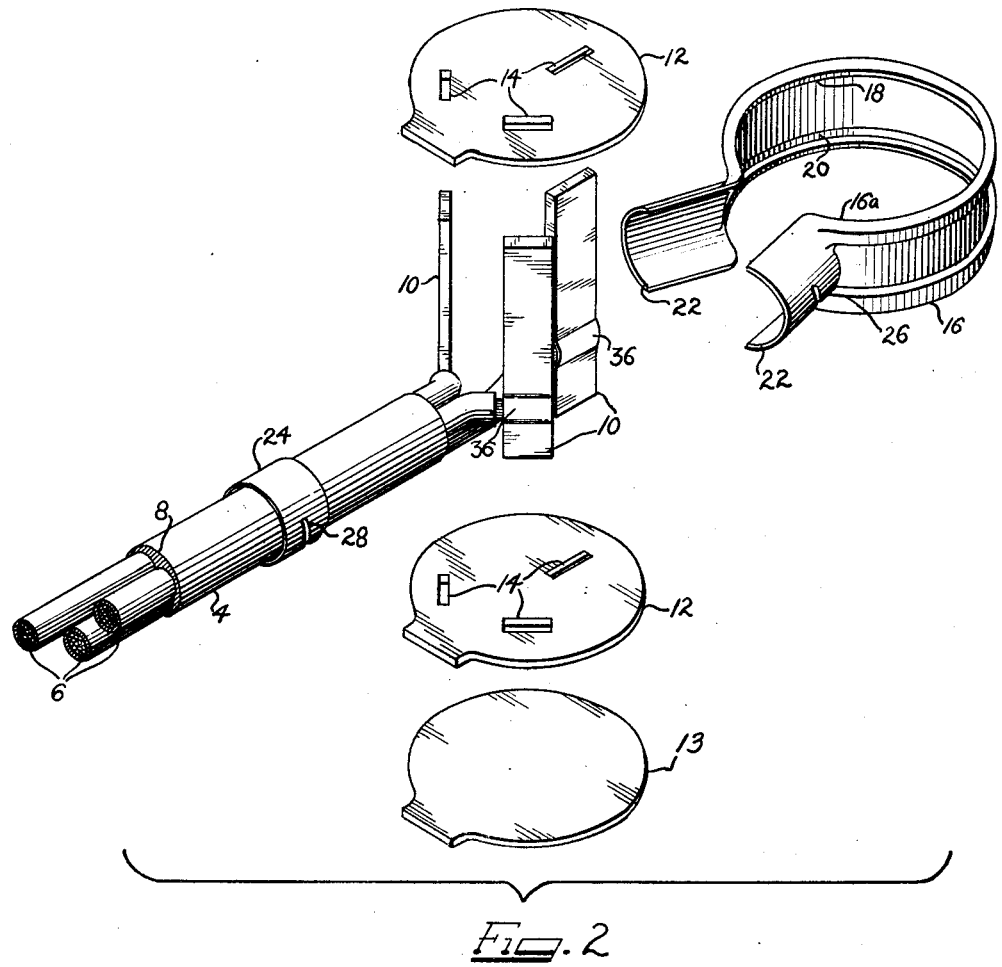
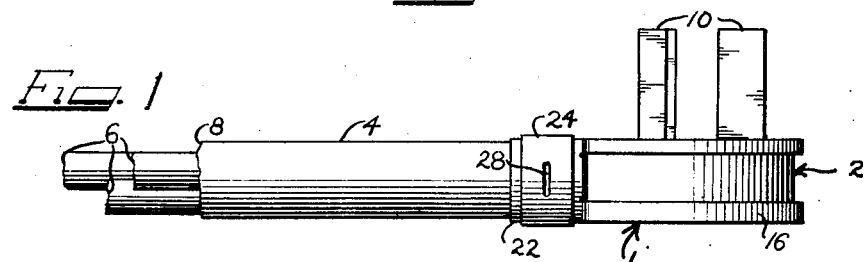
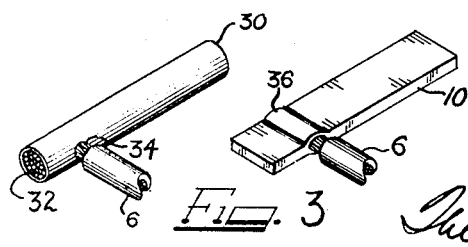
INVENTOR.
GEORGE J. GRASSLE
BY
ATTYS.

Patented Feb. 13, 1951

2,541,239

UNITED STATES PATENT OFFICE 2,541,239

ELECTRIC CORD AND PLUG SET

George J. Grassle, Detroit, Mich., assignor, by mesne assignments, to Philco Corporation, a corporation of Pennsylvania Application September 27, 1946, Serial No. 699,709

5 Claims. (Cl. 173—361)

1

This invention relates to an electric cord and plug set and to a method of manufacture of the terminal element of such set.

A feature of this invention is the application of an improved method for securing wires to prong-like terminal members utilized in electric cord and plug sets.

In accordance with this invention, the terminal member is initially formed of hollow tubular construction and the bare wire ends are inserted into the bore of the hollow tube through a radial hole in the wall thereof. The ends of the wire are bent within the tube so as to lie in substantial parallelism with the bore thereof. Then the tubular member is compressed about the wires contained therein to form a substantially solid mass, thus providing excellent electrical connection between the wire and the terminal member and concurrently a rigid mechanical joint.

A further feature of this invention is the provision of an improved cord and plug set wherein a plurality of terminal members are supported in laterally spaced relationship with respect to each other by being inserted into snugly fitting apertures in a plurality of insulating disks. Such insulating disks are spaced apart longitudinally along the length of the terminal members and are retained in such spaced apart relationship through the medium of a split clamping ring.

A further feature of this invention is the formation of the free ends of the clamping ring as semi-tubular members which when clamped together form a protecting conduit which will surround all of the wires which are individually connected to the terminal members.

Accordingly, it is an object of this invention to provide an improved cord and plug set characterized by the outstanding simplicity and ease of manufacture of the components thereof, which components are readily assembled into a compact and sturdy unit within which the various current carrying elements are completely insulated from each other.

Another object of this invention is to provide an improved method for effectuating the permanent electrical and mechanical connection of a wire to a prong-like terminal member.

A further object of this invention is to provide an improved cord and plug set wherein prong-like electrical terminal members to which individual wires of the cord are secured, are supported in laterally spaced relationship by a plurality of insulating disks, which are in turn maintained in longitudinally spaced relationship by a split clamping ring.

2

The specific nature of the invention, as well as other objects and advantages thereof, will become apparent to those skilled in the art from the following detailed description of the annexed sheet of drawings, which, by way of preferred example only, illustrate one specific embodiment of the invention.

On the drawings:

Figure 1 is a side elevational view of an assembled electric cord and plug set embodying this invention.

Figure 2 is an exploded perspective view of the components constituting the cord and plug set of Figure 1.

Figure 3 is a perspective view illustrating the method of connection of the electric wires to the prong-like terminal members of the cord and plug set.

As shown on the drawings:

An electric cord and plug set embodying this invention is indicated generally on the drawing by the numeral 1. While in the specific example illustrated in the drawing, the plug has been shown to be of the type utilizing three prong-like electrical terminal members, such as is conventionally used in connecting electric stoves to a house-wiring system, it will be understood that the principles of this invention are applicable to electric plugs having one or more terminal elements.

The cord and plug set 1 embodies a plug portion 2 which is permanently, mechanically and electrically connected to an electric cord or cable 4. Cord 4 may comprise any one of several well-known forms and is here illustrated as comprising three insulated stranded conductors 6 which are all retained within a single outer insulated coating 8. Each of the conductors 6 are electrically and mechanically connected to a prong-like terminal member 10 which, in its finished form preferably constitutes a generally rectangular block of electrically conducting material. The point at which electrical connection of the individual wires 6 are made to the terminal members 10 is preferably intermediate the ends of the terminal members 10 and, in the preferred construction illustrated in the drawing, is closer to the bottom end of such terminal members than to the top end.

A pair of identical insulating disks 12 are provided, each of which includes apertures 14 corresponding to the cross section of the terminal members 10 and located in spaced relationship on the disks 12 to conform to the desired lateral spacing of the terminal members 10 in the assembled plug. The one disk 12 is slipped over the top ends of the terminal members 10 and pushed down a substantial distance from such top ends to overlie the point of connections of the electric wires 6 to such terminal members. The other disk 12 is slipped over the bottom ends of the terminal members 10 but is advanced on such terminal members only sufficiently to bring the ends of such terminal members flush with the bottom surface of the bottom disk 12. A third insulating disk 13 which is of similar configuration as the disk 12 but is non-apertured is then placed in abutting relationship to the bottom surface of the bottom disk 12. Disk 13 thus prevents any possibility of external contact with the bottom ends of the terminal members 10 which project through the apertures in bottom disk 12.

The disks 12 and 13 are maintained in longitudinally spaced relationship with respect to the terminal members 10 by a split clamping ring 16. Clamping ring 16 embodies a split, generally cylindrical body portion 16a having peripheral, outwardly extending recesses 18 and 20 at each end thereof to respectively receive the peripheral edges of the top disk 12 and the bottom disk 12 and the insulating disk 13.

As a further feature of this invention, the free ends 22 of the clamping ring 16 are preferably formed as semi-tubular members, which, when clamped together will define a conduit which will snugly surround the external periphery of the cord 4. The clamping of the free ends 22 may be conveniently accomplished by a ring 24 which is slipped over the cord 4 to surround the semi-tubular free ends 22 and maintain them in clamping relationship about the cord 4. To prevent accidental displacement of the clamping ring 24, cooperating indentations 26 and 28 may be provided respectively on the outer surface of one of the free ends 22 and the inner surface of the retaining ring 24.

From the construction described, it will be apparent that a cord and plug set embodying this invention provides an unusually mechanically sturdy assemblage which may nevertheless be readily disassembled into its component elements for replacement of any of such elements. At the same time, the cord and plug set embodying this invention incorporates an unusual degree of electrical safety, inasmuch as all of the current carrying parts of the assembly are completely and permanently insulated from contact with each other.

While any conventional method may be utilized for securing the ends of the individual wire 6 to the terminal members 10, I preferably utilize the method which is illustrated in Figure 3 of the drawing. Terminal member 10 is originally formed from a hollow tubular member 30 which has an axial bore 32 extending therethrough and a radial hole 34 in the side wall at the point where it is desired to effect electrical connection of one of the wires 6. The bared free ends of the wire 6, which is preferably of the stranded variety, is then inserted into the radial hole 34. The inserted end of the wire 6 is then bent at a substantial angle to the adjacent portion of the wire so that such inserted end lies substantially parallel to the bore 32 of the hollow tube 30. Such bending of the wire may be accomplished during the radial insertion or may be performed prior to insertion of the end of the wire into the tube 30 and the bent over end of the wire inserted through the radial hole by use of a tilting movement. The tubular member 30 with the inserted wire end is then subjected to a pressing operation and is compressed into a substantially solid mass of rectangular, prong-like configuration suitable for use in the plug 2. The application of such method provides an unusually good electrical connection between the wire 6 and the terminal member 10 and contributes greatly to the operating life of the cord and plug set. If desired, the pressing die may be suitably shaped so as to define a transverse rib 36 on each side of the terminal member 10 overlying the point at which the end of wire 6 enters such terminal member. Such ribs obviously determine the minimum longitudinal spacing between the top and bottom insulating disks 12 in the assembly of the plug 2 and may be suitably proportioned so as to eliminate any possibility of pressure being exerted upon the wire 6 by virtue of either of the insulating disks 12 coming in contact therewith.

It will be noted that the cooperation of ring 24 with tubular ends 22 not only maintains the plug components in assembled relation but also exerts a clamping force on cable 2 to provide a strain relief effect.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. An electric terminal plug comprising a plurality of elongated prong members, means for securing electric wires respectively to said prong members, a plurality of insulating spacer disks having apertures therethrough for respectively receiving said prong members therein to position said prong members laterally with respect to each other, said spacer disks being mounted on said prong members in spaced relation along the length of the prong members, a split ring having a circular body portion constructed and arranged to surround said spacer disks and secure them in longitudinally spaced relationship, said split ring having radially disposed, semi-tubular free ends constructed and arranged to surround all of said wires, and a clamping ring surrounding said tubular free ends to retain said ends together in surrounding relationship to said wires.

2. A terminal plug comprising a plurality of elongated prong members, means for securing electric wires respectively to said prong members at an intermediate point along the length thereof, a plurality of insulating spacer disks having apertures therethrough for respectively receiving said prong members therein to position said prong members laterally with respect to each other, said spacer disks being mounted on said prong members in spaced relation along the length of the prong members and on opposite sides of the junction of said wires with said prong members, a split ring having a circular body portion constructed and arranged to surround said spacer disks and secure them in longitudinally spaced relationship, said split ring having radially disposed, semi-tubular free ends constructed and arranged to surround all of said wires, and a clamping ring surrounding said semi-tubular free ends to retain said ends together in surrounding relationship to said wires.

3. An electric terminal plug comprising a plurality of elongated prong members, means for securing electric wires respectively to said prong members, a first insulating disk having apertures therethrough for respectively receiving said prong members therein to position said prong members laterally with respect to each other, said first disk being mounted on said prong members in an intermediate position, a second insulating disk having apertures aligned with the apertures in said first insulating disk, said second disk being mounted on said prong members to receive the ends of said prong members in its apertures, a third, non-apertured insulating disk abutting said second disk on the side opposite the position of said first disk to insulate the ends of said prongs, and means for securing said first insulating disk in longitudinally spaced relationship along said prong members with respect to said second insulating disk.

4. An electric terminal plug comprising a plurality of elongated prong members, means for securing electric wires respectively to said prong members at a point intermediate the length thereof, a first insulating disk having apertures therethrough for respectively receiving said prong members therein, to position said prong members laterally with respect to each other, said first insulating disk being mounted on said prong members at a position intermediate the junction point of said wires and said prong members and the one end of said prong members, a second insulating disk having apertures aligned with the apertures in said first insulating disk, said second insulating disk being mounted on said prong members on the opposite side of the junction of said wires and said prong members with respect to said first insulating disk and receiving the ends of said prong members in its apertures, a third, non-apertured insulating disk abutting said second insulating disk on the side opposite the position of said first insulating disk to insulate the ends of said prong members, a split ring having a circular body portion constructed and arranged to surround all of said insulating disk and to secure said first insulating disk in longitudinally spaced relationship with respect to said second and third insulating disks, said split ring also having radially disposed, semi-tubular free ends constructed and arranged to surround all of said wires, and a clamping ring surrounding said semi-tubular free ends to retain said ends together in surrounding relationship to said wires.

5. An electrical terminal comprising a plurality of elongated prong members, a plurality of insulated spacer disks having openings for receiving said prong members to position said prong members laterally with respect to each other, a split ring having a cylindrical inner wall provided with axially spaced annularly arranged means for receiving the peripheries of said spacer disks, said split ring having offset end portions and means for clamping said end portions to constrict said ring about said spacer disks with their peripheries in said receiving means and thus hold said disks in fixedly spaced relationship to each other.

GEORGE J. GRASSLE.

REFERENCES CITED

The following references are of record in the file of this patent:

UNITED STATES PATENTS

| Number | Name | Date |
| --- | --- | --- |
| 751,320 | Mead | Feb. 2, 1904 |
| 1,147,450 | Shaw | July 20, 1915 |
| 1,233,568 | Getts | July 17, 1917 |
| 1,560,308 | Perry | Nov. 3, 1925 |
| 1,612,337 | Wilson | Dec. 28, 1926 |
| 2,054,612 | White | Sept. 15, 1936 |
| 2,071,164 | Galvao | Feb. 16, 1937 |
| 2,106,007 | Klein | Jan. 18, 1938 |
| 2,117,353 | Park | May 17, 1938 |
| 2,132,870 | Geyer | Oct. 11, 1938 |
| 2,174,383 | Folsom | Sept. 26, 1939 |
| 2,197,793 | Everett | Apr. 23, 1940 |
| 2,249,619 | Perkins | July 15, 1941 |
| 2,383,926 | White | Aug. 28, 1945 |
| 2,396,901 | Tiffany | Mar. 19, 1946 |